Patented Aug. 4, 1953

2,647,908

UNITED STATES PATENT OFFICE 2,647,908

TETRACYANO AND TETRACARBOXY PHTHALOCYANINES

Saul R. Buc, Easton, Pa., assignor to General Aniline & Film Corporation, New York, N. Y., a corporation of Delaware No Drawing. Application February 11, 1950, Serial No. 143,835

7 Claims. (Cl. 260—314.5)

This invention relates to novel tetracyano and tetracarboxy derivatives of copper phthalocyanines containing 1 to 3 substituent aryl hydrocarbon groups of the benzene series, and to a process for their preparation.

The tetracarboxylic acids of this invention, in the form of their alkali metal salts, are completely soluble in water, and are useful in alkaline writing inks, yielding green colorations of exceptional brilliance and fastness to light and other atmospheric influences. They are likewise useful for the coloration of soap, paper, wallpaper, and printing inks. With heavy metals, the carboxylic acids form insoluble lakes of exceptional fastness to light. The corresponding tetracyano compounds are valuable as intermediates for the tetracarboxylic acids, and are themselves green pigments of outstanding fastness to light.

The tetracyano compounds of this invention are conveniently prepared by reaction of cuprous cyanide with a mixture of a phenyl-cyano-dihalo derivative, and a cyano-dihalo derivative, of an aromatic hydrocarbon of the benzene or naphthalene series, wherein two of the cyano and halo substituents of each of said reagents are in mutually ortho position, and the mol ratio of the aforesaid reagents in said mixture ranges from 1:3 to 3:1.

The ensuing reaction results in replacement of the halogen atoms by CN groups, and condensation of the resulting cyano-ortho-dinitriles to form copper phthalocyanines containing four nuclear cyano groups and 1 to 3 phenyl groups as nuclear substituents. The copper phthalocyanine nucleus to which these substituents are attached has the following structure:

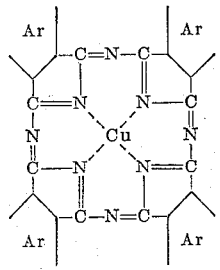

wherein

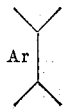

represents a mononuclear arylene group, particularly of the benzene or naphthalene series.

The reaction can be conveniently carried out by merely heating the mixture of dihalocyano compounds with an excess of cuprous cyanide at a temperature of 150 to 400° C. The resulting melt is powdered, and excess copper salts extracted, e. g. with aqueous sodium cyanide solution, leaving a copper tetracyano mono- to triaryl-substituted phthalocyanine as an insoluble residue. The residue can be acid-pasted by dissolving it in concentrated sulfuric acid and reprecipitating by drowning in water.

In order to obtain the corresponding carboxy-substituted phthalocyanines, the tetracyano derivative is hydrolyzed, for example, by boiling with aqueous alkali (e. g. 10% aqueous caustic soda solution) until ammonia is no longer evolved, and a clear solution is obtained. The free tetracarboxy acid can be precipitated from the resulting solution by acidifying with a mineral acid, and recovered by filtration. The tetracarboxylic acids thus obtained are readily and completely soluble in aqueous alkaline solutions, and are characterized by green shades of exceptional fastness to light.

The halogen substituents contained in the phenyl-cyano-dihalo-substituted aromatic hydrocarbons, employed as intermediates for the compounds of this invention, can be chlorine or bromine. Preparation of 1 - phenyl - 3,5 - dihalo-2-cyanobenzenes, suitable as intermediates in the present process, is described in my previous application Serial No. 68,733 of December 31, 1948, now U. S. Patent 2,497,060, and these compounds are preferred for the purposes of this invention. However, other phenyl-substituted dihalobenzenes are suitable in which the cyano, halo and phenyl substituents occupy any positions such that at least two of the cyano and halo substituents are in mutually ortho position. The substituent phenyl hydrocarbon group of these compounds is preferably an unsubstituted phenyl radical, although it can also be a tolyl or xylyl radical.

As the second reagent, dihalo-cyano-substituted hydrocarbons of the benzene or naphthalene series are suitable in which at least two of the halogen and cyano groups are in mutually ortho position. These compounds include, for example, 2,3-, 2,4-, 3,4- and 2,6-dichloro- or -dibromo-phenyl cyanide 2,4 - dichloro - or - dibromo - 6 - methyl - phenyl cyanide 3,4-dibromo-6-methyl-phenyl cyanide
2,4-, 2,5-, 5,6- or 4,6-dichloro-3-methyl-phenyl cyanide
2,3-, 2,5-, or 2,6 - dichloro - 4 - methyl - phenyl cyanide
2,4-dichloro- or -dibromo-1-naphthyl cyanide
1,4-dichloro- or -dibromo-2-naphthyl cyanide These cyano compounds can be prepared from the corresponding dihaloanilines, toluidines, or naphthylamines by diazotization of the amino group, and replacement of the diazo group with a cyano group by the Sandmeyer reaction, i. e., by reaction with a cyanide in the presence of copper or cuprous cyanide.

The products of the invention are compounds (or mixtures of such compounds) having the formula

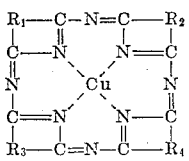

wherein the R's are aryl radicals of the benzene or naphthalene series, each containing a cyano or a carboxyl group, and 1 to 3 of said radicals containing, as a further substituent, a hydrocarbon radical or the benzene series.

The preparation of compounds in accordance with my invention is illustrated in the following examples, wherein parts and percentages are by weight unless otherwise indicated.

Example 1

93 parts (0.375 mol) of 2-cyano-3,5-dichlorobiphenyl and 21.5 parts (0.125 mol) of 2,5-dichlorobenzonitrile were thoroughly mixed and heated with agitation at 250° C. 100 parts (1.1 mol) of cuprous cyanide were added portionwise over a period of 2 hours to the mixture, allowing the heat of the reaction to dissipate after each addition, and maintaining the temperature at 275 to 290° C. Heating of the mixture was continued within the aforesaid temperature range for an additional hour, and the mass then allowed to cool and ground to a powder. Copper salts were extracted with aqueous sodium cyanide solution. The insoluble residue amounted to 101 parts, and consisted of tri-3-phenyl-tetra-5-cyano copper phthalocyanine.

Example 2

62 parts (0.25 mol) of 2-cyano-3,5-dichlorobiphenyl and 43 parts (0.25 mol) of 2,5-dichlorobenzonitrile were fused in the same manner as described in Example 1 with a similar amount of cuprous cyanide. A yield of 101 parts of an insoluble pigment was obtained consisting primarily of di-3-phenyl-tetra-5-cyano copper phthalocyanine.

Example 3

31 parts (0.125 mol) of 2-cyano-3,5-dichlorobiphenyl and 64.5 parts (0.375 mol) of 2,5-dichlorobenzonitrile were fused according to the procedure of Example 1 with a similar amount of cuprous cyanide, and the resulting pigment recovered from the reaction mixture in the same manner. 83.1 parts of mono-3-phenyl-tetra-5-cyano copper phthalocyanine were obtained in the form of a green powder insoluble in water.

Example 4

The products of the foregoing examples were converted into the corresponding tetracarboxy acids by dissolving them in concentrated sulfuric acid with addition of sufficient water to reduce the sulfuric acid concentration to 90%. The solution was heated at 100 to 105° C. for four hours, and then poured into water. The green precipitate thereby formed was filtered off, washed with water, dissolved in aqueous 10% caustic soda solution, and reprecipitated by acidifying the solution with hydrochloric acid. The products thus obtained are, respectively, mono-, di- and tri-3-phenyl-tetra-5-carboxy copper phthalocyanine.

Example 5

As an alternative method for conversion of the products of Examples 1 to 3 to the corresponding tetracarboxylic acids, the pigments obtained in said examples are dissolved in concentrated sulfuric acid, reprecipitated by drowning the resulting solution in water, filtered out and washed until free of acid, suspended in 10% aqueous caustic soda or caustic potash, boiled until evolution of ammonia ceases, and precipitated by acidifying the resulting solution with hydrochloric acid. The precipitated tetracarboxylic acids are filtered off and washed with water.

In each case, the tetracarboxylic acids produced in Examples 4 and 5 were soluble without residue in aqueous alkaline solutions, which formed the alkali metal salts. The solutions were colored bright green. Addition of salts of polyvalent lake-forming metals to the solutions of the resulting alkali metal salts yields insoluble lakes of tetracarboxylic acid compounds.

Instead of the cyano-dichlorobiphenyl compounds employed in the foregoing examples, there can be used other phenyl-dibromo- or dichlorophenyl or naphthyl cyanides in which at least two of the halogen and cyano groups occupy mutually ortho positions, and wherein the substituent phenyl nucleus may contain alkyl groups (e. g. methyl groups) as substituents. Similarly, instead of 2,5-dichlorophenyl cyanide, other dibromo- or dichloro-cyano-substituted hydrocarbons of the benzene and naphthalene series, as listed above, can be employed in similar molecular proportions. By employing molecular proportions of the aforesaid reagents intermediate between the ratios employed in Examples 1 to 3, the products obtained are primarily mixtures of mono- and di-, or di- and triphenyltetracyano copper phthalocyanines which possess shade and solubility properties similar to those of the compounds described in the examples.

If desired, the phthalocyanine fusion of Examples 1 to 3 can be carried out at somewhat lower temperatures by addition of a flux such as pyridine, quinoline, benzophenone, nitrobenzene, nitrotoluene or sodium sulfate. In general, temperatures from 150 to 400° C. can be used.

The tetracyano compounds of Examples 1 to 3 are green pigments of exceptional fastness to light, while the corresponding carboxy acids are valuable as coloring agents for alkaline compositions for use in aqueous solutions, such as aqueous writing inks, soap and printing inks. They can be employed for the production of brilliant green colorations on paper, wallpaper, and the like, having unusual permanence when exposed to light and atmospheric influences.

Variations and modifications which will be obvious to those skilled in the art can be made in the foregoing procedures without departing from the nature or scope of the invention.

I claim:

1. As a new composition of matter, a copper phthalocyanine in which the hydrocarbon nuclei of the phthalocyanine nucleus are of the class consisting of benzene and naphthalene nuclei, each of said nuclei containing a nuclear substituent of the class consisting of cyano and carboxyl groups, and wherein 1 to 3 of said nuclei contain as a further nuclear substituent, monocylic aryl hydrocarbon radical.

2. Copper phthalocyanine in which the hydrocarbon nuclei of the phthalocyanine nucleus are benzene rings, each of which contains a nuclear cyano group, and 1 to 3 of which contain a nuclear substituent phenyl group.

3. Copper phthalocyanine in which the hydrocarbon nuclei of the phthalocyanine nucleus are benzene rings, each of which contains a nuclear carboxy group, and 1 to 3 of which contain a nuclear substituent phenyl group.

4. Tetra-5-cyano copper phthalocyanine in which 1 to 3 of the benzene rings of the phthalocyanine nucleus contain a phenyl group as a substituent.

5. Tetra-5-carboxy copper phthalocyanine in which 1 to 3 of the benzene rings of the phthalocyanine nucleus contain a phenyl group as a substituent in 3-position.

6. A process which comprises fusing 1 to 3 mols of a nuclear dihalocyano-substituted aromatic hydrocarbon of which the nucleus is of the class consisting of benzene and naphthalene nuclei, and wherein at least two of the halo and cyano substituents occupy mutually ortho positions, with 1 to 3 mols of a nuclear aryl-dihalo-cyano-substituted aromatic hydrocarbon of which the nucleus is of the class consisting of benzene and naphthalene nuclei, and in which the substituent aryl radical is a monocyclic hydrocarbon radical and at least two of the halo and cyano substituents occupy mutually ortho positions, with cuprous cyanide at a temperature of 150 to 400° C.

7. A process as defined in claim 6 in which the tetracyano phthalocyanine compound obtained is hydrolyzed to the corresponding tetracarboxylic acid.

SAUL R. BUC.

References Cited in the file of this patent

UNITED STATES PATENTS

| Number | Name | Date |
|---|---|---|
| 2,213,517 | Biernert et al. | Sept. 3, 1940 |
| 2,286,679 | Heilbron et al. | June 16, 1942 |
| 2,497,060 | Buc | Feb. 14, 1950 |